US008523243B2

(12) United States Patent
Geese et al.

(10) Patent No.: US 8,523,243 B2
(45) Date of Patent: Sep. 3, 2013

(54) PIPE CLAMP WITH SLEEVE AND GASKET

(75) Inventors: Brian T. Geese, Lake Orion, MI (US); Brian T. Ignaczak, Rochester, MI (US)

(73) Assignee: Norma U.S. Holding LLC, Auburn Hills, MI (US)

( * ) Notice: Subject to any disclaimer, the term of this patent is extended or adjusted under 35 U.S.C. 154(b) by 196 days.

(21) Appl. No.: 12/870,121

(22) Filed: Aug. 27, 2010

(65) Prior Publication Data
US 2011/0210546 A1 Sep. 1, 2011

Related U.S. Application Data

(60) Provisional application No. 61/237,835, filed on Aug. 28, 2009.

(51) Int. Cl.
*F16L 47/00* (2006.01)
(52) U.S. Cl.
USPC ........... 285/252; 285/254; 285/337; 285/349; 285/365; 285/420
(58) Field of Classification Search
USPC ................. 285/252–254, 337, 365, 407, 420, 285/349
See application file for complete search history.

(56) References Cited

U.S. PATENT DOCUMENTS

| | | | | |
|---|---|---|---|---|
| 2,227,551 A | * | 1/1941 | Morris | 285/373 |
| 3,004,781 A | * | 10/1961 | Morris | 285/369 |
| 4,056,273 A | * | 11/1977 | Cassel | 285/337 |
| 4,312,526 A | * | 1/1982 | Cassel | 285/419 |
| 6,758,501 B2 | * | 7/2004 | Amedure et al. | 285/373 |
| 7,025,393 B2 | * | 4/2006 | Amedure et al. | 285/419 |
| 7,252,310 B2 | * | 8/2007 | Amedure et al. | 285/419 |
| 7,410,192 B2 | * | 8/2008 | Ignaczak et al. | 285/373 |
| 7,520,539 B2 | | 4/2009 | Ignaczak et al. | |
| 2002/0014772 A1 | * | 2/2002 | Amedure et al. | 285/373 |
| 2006/0175837 A1 | * | 8/2006 | Ignaczak et al. | 285/420 |

FOREIGN PATENT DOCUMENTS

| | | |
|---|---|---|
| JP | 2003-502597 A | 1/2003 |
| KR | 10-2004-0080334 A | 9/2004 |
| KR | 10-2007-0104932 A | 10/2007 |

OTHER PUBLICATIONS

International Search Report for PCT/US2010/046944, 3 pages.

* cited by examiner

*Primary Examiner* — Aaron Dunwoody
*Assistant Examiner* — Fannie Kee
(74) *Attorney, Agent, or Firm* — Reising Ethington P.C.

(57) ABSTRACT

A pipe clamp that includes a band, tightening mechanism for the band, a split sleeve within the band, and gasket located inside a circumferential channel in the split sleeve. The split sleeve includes a tongue-and-groove joint in which the tongue has at least one side edge that confronts and engages a side edge of the groove during penetration of the tongue into the groove in response to tightening of the outer band using the fastening mechanism. This provides a metal-to-metal seal at the tongue-and-groove joint. The relative construction of the tongue and groove is such that during penetration of the tongue into the groove, there are areas of spaced separation between the confronting side edges of the tongue and groove. Also, during tightening, the gasket is forced into these areas of spaced separation which provides a second, gasketed seal at the tongue-and-groove joint.

14 Claims, 4 Drawing Sheets

PIPE CLAMP WITH SLEEVE AND GASKET

CROSS-REFERENCE TO RELATED APPLICATION

This application claims the priority of U.S. Provisional Application No. 61/237,835, filed Aug. 28, 2009, the entire contents of which are hereby incorporated by reference.

TECHNICAL FIELD

This invention relates generally to pipe clamps and, more particularly, to pipe clamps including sleeves and gaskets for providing a gas-tight connections between pipes.

BACKGROUND OF THE INVENTION

Pipe clamps are commonly used to join variously structured pipes and other tubular bodies in exhaust systems. To be effective, a joint between the pipes should provide a fluid-tight seal, should maintain an acceptable leak rate, and should have good resistance against axial separation. One type of pipe clamp is a band clamp which is used with telescopically overlapping pipes, and another type is a pipe coupler which is used with end-to-end abutting or closely abutting pipes. Both types typically include a band to be placed and tightened over the pipes, and both types can include a sleeve, a gasket, or both to be placed and tightened over the pipes beneath the band. The sleeve can be a split sleeve with an open loop structure having confronting circumferential ends. The confronting ends can sometimes have a tongue-and-groove construction. Examples of split sleeves with and without tongue-and-groove constructions are taught in U.S. Pat. Nos. 7,520,539, 7,410,192, 7,252,310, 7,025,393, and 6,758,501, all owned by the assignee of the present patent application.

SUMMARY OF THE INVENTION

In accordance with one embodiment of the invention there is provided a pipe clamp that includes a band, tightening mechanism for the band, a split sleeve within the band, and gasket located inside a circumferential channel in the split sleeve. The split sleeve includes a tongue-and-groove joint in which said tongue has at least one side edge that confronts and engages a side edge of the groove during penetration of the tongue into the groove in response to tightening of the outer band using the fastening mechanism. This provides a metal-to-metal seal at the tongue-and-groove joint, thereby helping to prevent the flow of fluids through the joint. The relative construction of the tongue and groove is such that during penetration of the tongue into the groove, there are areas of spaced separation between the confronting side edges of the tongue and groove. Also during tightening the gasket is forced into these areas of spaced separation which provides a second, gasketed seal at the tongue-and-groove joint.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE PREFERRED EMBODIMENT(S)

Figure 1:
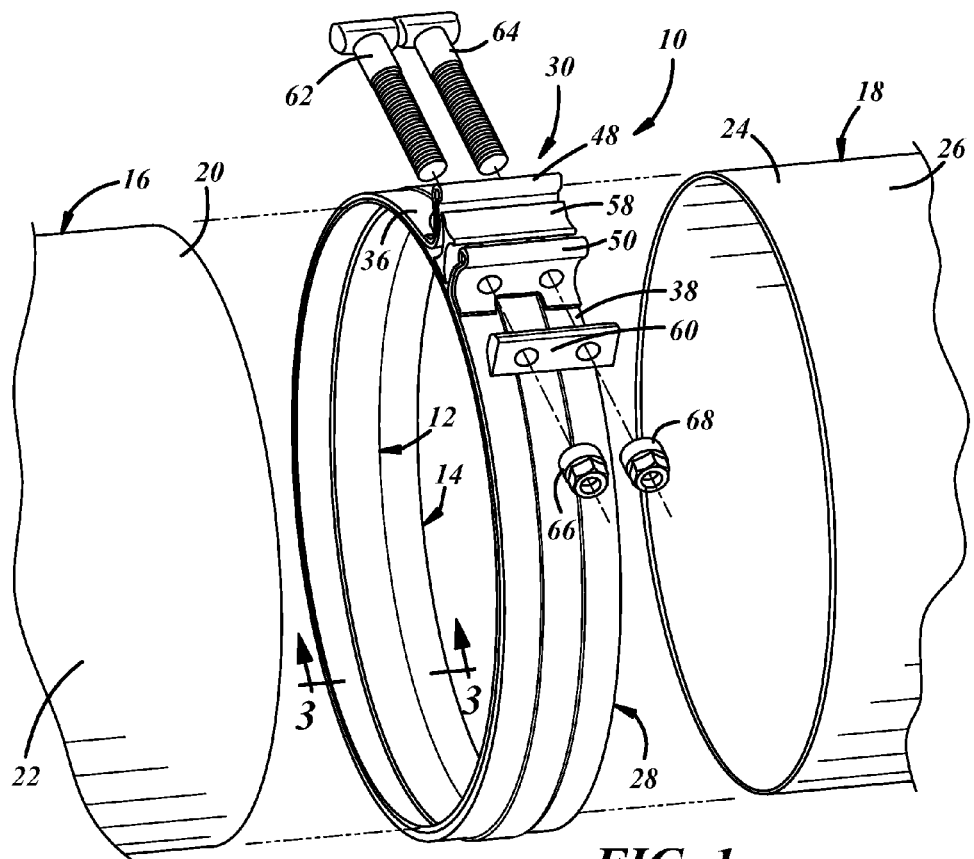
FIG. 1 is a partially exploded view of an exemplary embodiment of a pipe clamp.
Figure 3:
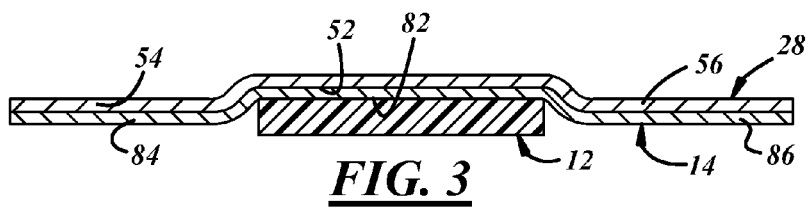
FIG. 3 is an enlarged cross-sectional view taken at 3-3 in FIG. 1.

Referring to the drawings, FIGS. 1-13 show two exemplary embodiments of a pipe clamp 10 used to join ends of pipes in an automotive exhaust system to provide a fluid-tight seal with good resistance against axial separation. As used herein, the term pipe(s) refers to tubular structures such as exhaust pipes, catalytic converters, diesel particulate filters, and other exhaust system components, that can be used in automotive applications such as heavy trucks and passenger cars, or that can be used in non-automotive applications such as generators, locomotives, and agricultural equipment, to name but a few examples. The term pipes also includes other tubular automotive components as well as tubular non-automotive bodies that can be clamped together. The pipe clamp 10 provides an initial low-leak seal via a gasket 12 and a subsequent low-leak seal via metal-to-metal contact formed at a tongue-and-groove joint and/or formed between a split sleeve 14 and an underlying surface of the pipe. In general, the pipe clamp 10 has a circular and cylindrical shape that defines an axial direction extending along or generally parallel to a center axis of the shape, a radial direction extending along a radius of the shape, and a circumferential direction extending along a circumference of the shape.

Referring to FIG. 1, in the illustrated embodiment the pipe clamp 10 is used in an end-to-end abutting or closely abutting joint, but could be adapted for a telescopically overlapping joint. Depending upon the application, a first pipe 16 and a second pipe 18 could be tubular bodies of a catalytic converter and/or a diesel particulate filter, could be exhaust pipes, or could be nonautomotive tubular bodies; in the case of automotive tubular bodies, fluid such as exhaust gas flows through the first and second pipes. The first and second pipes 16, 18 are made of a metal such as a 400 series stainless steel. The first pipe 16 has a first end 20 and a first outer surface 22, and the second pipe 18 has a second end 24 and a second outer surface 26. When assembled, the first and second ends 20, 24 confront each other, and can abut or be slightly spaced apart to form a gap up to about, for example, 10 mm; of course other gap dimensions are possible.

In the illustrated embodiment of FIGS. 1-8, the pipe clamp 10 includes a band 28, a tightening mechanism 30, the split sleeve 14, and the gasket 12.

Figure 2:
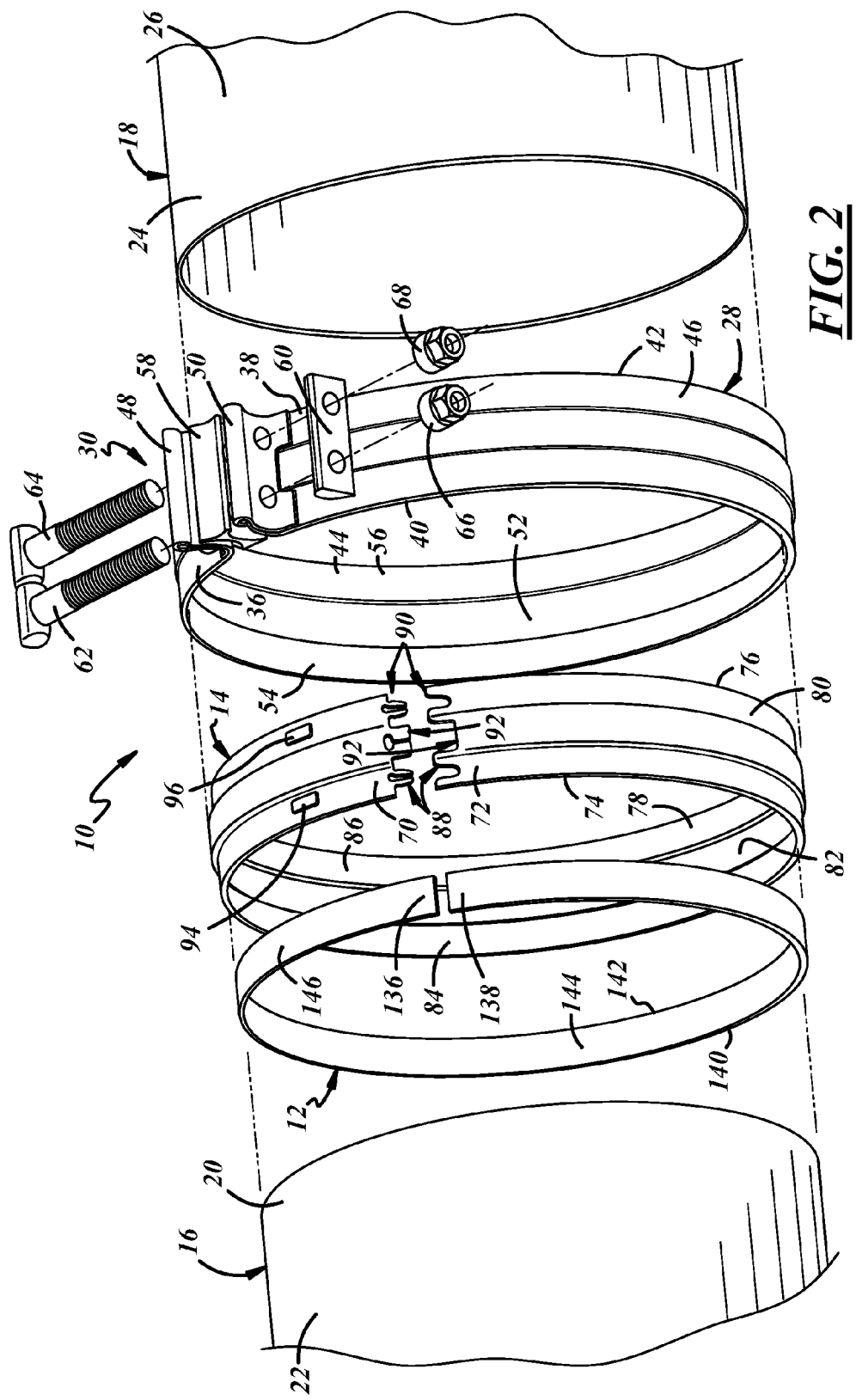
FIG. 2 is an exploded view of the pipe clamp of FIG. 1.

The band 28 can be made from a sheet of steel, such as grade 409 stainless steel or another suitable material, that is metal-worked into an open loop. In different examples, the band 28 can have an axial width ranging between about 55-68 mm; of course other dimensions are possible and will depend on the application. Referring to FIGS. 1 and 2, the band 28 extends in the circumferential direction from a first circumferential end 36 to a second circumferential end 38, and extends in the axial direction from a first side 40 to a second side 42. On a radially-inwardly facing side the band 28 has an inner surface 44, and on a radially-outwardly facing side the band has an outer surface 46.

Referring to FIGS. 1-4, the band 28 has a first and second flange 48, 50, a channel 52, and an unchanneled portion including a first and second side wall 54, 56. The first and second flanges 48, 50 extend from respective first and second ends 36, 38, and are formed by portions of the band 28 folded away from each other and back onto themselves to produce a pair of radially-protruding loops, each loop having an inner and an outer leg. The inner and outer legs can, though need not, be spot-welded together or could be mechanically attached by another way. The channel 52 complements the shape of a corresponding channel in the split sleeve 14 as will be subsequently described. The channel 52 is located axially about midway in the band 28 inboard of the first and second sides 40, 42, and extends circumferentially between the first and second ends 36, 38. The channel 52 can extend into the folded over material of the radially protruding loop as shown, whereby the outer leg of the folded over material has a cutout or relieved section to accommodate the extension. The channel 52 can extend circumferentially into the first and second flanges 48, 50 such that each flange has a slightly radially protruding rib located at a lower portion thereof. The channel 52 is located in the inner surface 44 and produces a slightly radially protruding rib in the outer surface 46. The first and second side walls 54, 56 extend in opposite axial directions from the channel 52.

The tightening mechanism 30 is connected to the band 28 and can be tightened and loosened to bring the first and second ends 36, 38 toward and away from each other. Referring to FIGS. 1 and 2, in the illustrated embodiment the tightening mechanism 30 includes a double bolt-and-nut fastener combination, a reaction block 58, and a backing plate 60. The fastener combination includes a first and second T-bolt 62, 64, and a first and second nut 66, 68. Each T-bolt has a half-cylindrical head for evenly distributing tightening forces, and has a partly threaded shank. The reaction block 58 has a double convex shape and has a pair of passages for insertion of the first and second T-bolts 62, 64. The reaction block 58 also has a radially-inward-facing surface (not shown). The backing plate 60 has a half-cylindrical shape and has a pair of passages for insertion of the first and second T-bolts 62, 64. When assembled, the first and second T-bolts 62, 64 are also inserted through passages located in the first and second flanges 48, 50. When tightened, the first and second nuts 66, 68 are screwed down on the first and second T-bolts 62, 64, and the half-cylindrical heads, reaction block 58, and backing plate 60 act together to pull the first and second ends 36, 38 toward each other and cause a radially inward force that is distributed around the circumference of the band 28. In other embodiments, the tightening mechanism 30 can have different constructions and configurations. For example, the tightening mechanism 30 can have a single bolt-and-nut fastener combination, the reaction block 58 and backing plate 60 can have a notch provided in their radially-facing inward surfaces to accommodate the slightly radially protruding rib of the band 28, and the reaction block and/or backing plate need not be provided.

When assembled, the split sleeve 14 is located radially inside of the band 28 and is connected to the band via one or more spot welds at different circumferential locations, and/or could be connected to the band in another way such as a mechanical connection with structural projections extending from the split sleeve and complementary cutouts in the band to receive the projections. The split sleeve 14 can be made from a sheet of steel, such as grade 409 stainless steel or another suitable material, that is metal-worked into an open loop. In general, the split sleeve 14 has a shape that complements the shape of the band 28. In different examples, the split sleeve 14 can have an axial width ranging between about 55-68 mm; of course other dimensions are possible and will depend on the application. Referring to FIGS. 1-4, the split sleeve 14 extends in the circumferential direction from a first circumferential end 70 to a second circumferential end 72 that confronts the first circumferential end. The split sleeve 14 extends in the axial direction from a first side 74 to a second side 76. On a radially-inwardly facing side the split sleeve 14 has an inner surface 78, and on a radially-outwardly facing side the split-sleeve has an outer surface 80.

In the illustrated embodiment, the split sleeve 14 has a channel 82, an unchanneled portion including a first and second side wall 84, 86, and a first, second, and third tongue-and-groove joint 88, 90, 92. The channel 82 receives the gasket 12 which can be pre-assembled in the split sleeve prior to use. The channel 82 is located axially about midway in the split sleeve 14 inboard of the first and second sides 74, 76, and extends circumferentially between the first and second ends 70, 72. The channel 82 is located in the inner surface 78 and produces a slightly radially protruding rib in the outer surface 80. The first and second side walls 84, 86 extend in opposite axial directions from the channel 82. Referring to FIG. 2, the first and second side walls 84, 86 have a first and second embossment 94, 96 located therein. Each embossment 94, 96, produces a slightly radially protruding rectangular structure in the outer surface 80 with a protrusion height similar to that of the radially protruding rib produced by the channel 82. In the axial direction, each embossment 94, 96 spans a majority of the axial extent of the respective side wall 84, 86, and in the circumferential direction, each embossment spans the circumferential extent of the reaction block 58. When assembled and tightened, the radially-inward-facing surface of the reaction block 58 contacts and exerts a radial inward force to the first and second embossments 94, 96 substantially completely across the axial width of the split sleeve 14 at a gap formed between first and second flanges 48, 50 in the band 28.

Figure 5:
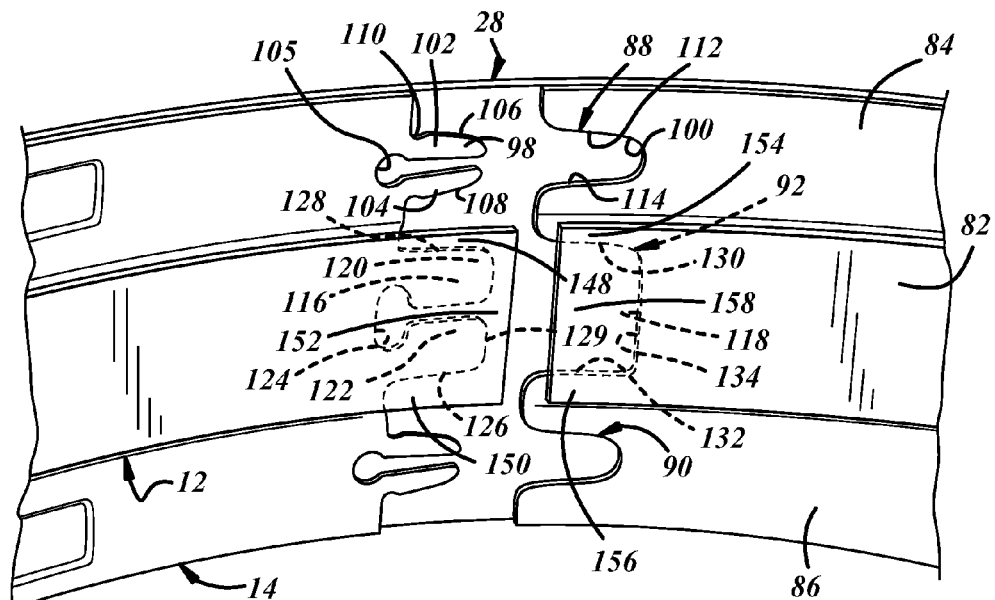
FIG. 5 is a close-up view of an exemplary embodiment of multiple tongue-and-groove joints and a gasket.
Figure 6:
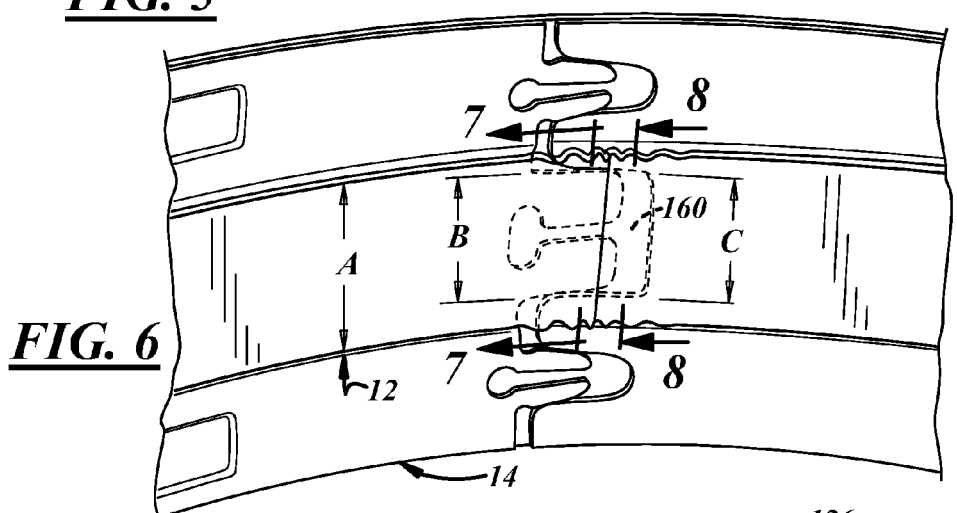
FIG. 6 is a close-up view of the tongue-and-groove joints of FIG. 5, showing the tongues penetrated in the grooves.

The first, second, and third tongue-and-groove joints 88, 90, 92 come together upon tightening of the band 28 and can form a seal against fluid leakage out of the first and second pipes 16, 18. Referring to FIGS. 2, 5, and 6, the first and second joints 88, 90 are located respectively in the first and second side walls 84, 86, and the third joint 92 is located in the channel 82. The first and second joints 88, 90 have a similar construction and will be described with reference to the first joint. In the illustrated embodiment, the first joint 88 has a tongue 98 and a groove 100. The tongue 98 extends from the first end 70 and confronts the groove 100 which is formed in the second end 72. The tongue 98 has a first and second spring member 102, 104 separated by a relief slot 105. The tongue 98 has first and second side edges 106, 108 which each have a radiused corner 110. The groove 100 is bounded by first and second side edges 112, 114 which converge toward each other with increasing depth of the groove. Upon collapse of the first joint 88, the spring members 102, 104 are deflected toward each other as the tongue 98 penetrates the groove 100. The side edges 106, 108 directly contact the respective side edges 112, 114 (metal-to-metal) upon initial penetration and maintain direct contact throughout the entire range of penetration which, as shown in FIG. 6, need not be full penetration. A metal-to-metal seal against fluid leakage is formed between the side edges 106, 108, 112, and 114.

Still referring to FIGS. 2, 5, and 6, in the illustrated embodiment the third joint 92 has a tongue 116 and a confronting groove 118. The tongue 116 has a first and second spring member 120, 122 separated by a relief slot 124. The tongue 116 also has first and second side edges 126, 128 and a free end 129. The groove 118 is bounded by first and second side edges 130, 132 and by a bottom edge 134. Upon collapse of the third joint 92, the spring members 120, 122 can be deflected toward each other as the tongue 116 penetrates the groove 118, though in some cases the spring members are not deflected because the side edges 126, 128 of the tongue do not always make contact with the side edges 130, 132 of the groove. Rather, the tongue 116 can be used simply to support the gasket 12.

In other embodiments, the split sleeve 14 can have different constructions and configurations. For example, flanges can be provided on the first and second sides 74, 76, there can be a different number of tongue-and-groove joints such as only the third joint 92 being provided, and/or the tongue-and-groove joints themselves can have different constructions and configurations such as that taught in U.S. Pat. No. 6,758,501.

The gasket 12 is seated in the channel 82 and forms a seal at the first and second pipe ends 20, 24. The gasket 12 can be made of a relatively soft material that is compressed when the band 28 is tightened; suitable materials include a graphite-based material, a mica-based material, a ceramic fiber, or a fiber glass, to name but a few examples. Referring to FIGS. 1-4, the gasket 12 is a split gasket with an open loop structure. The gasket 12 extends circumferentially from a first circumferential end 136 to a second circumferential end 138, and extends axially from a first side 140 to a second side 142. On a radially-inwardly facing side the gasket 12 has an inner surface 144, and on a radially-outwardly facing side the gasket has an outer surface 146. The outer surface 146 can have a pressure sensitive adhesive disposed thereon to preassemble the gasket 12 to the channel 82 and to the tongue 116. In other embodiments the gasket 12 can have different constructions. For example, the gasket 12 need not be a split gasket and instead could be circumferentially continuous.

Referring to FIGS. 5 and 6, the gasket 12 has an axial width A measured between the first side 140 and the second side 142 that is approximately equal to an axial width of the channel 82; of course, the axial width A can be greater than or less than the axial width of the channel. The axial width A is greater than an axial width B of the tongue 116. A first and second lateral overhang portion 148, 150 are provided beyond the first and second side edges 126, 128. The first end 136 of the gasket 12 extends circumferentially beyond the free end 129 of the tongue 116 to provide a circumferential overhang portion 152. Furthermore, the axial width A is greater than an axial width C of the groove 118. A first and second lateral overhang portion 154, 156 are provided beyond the first and second side edges 130, 132. The second end 138 of the gasket 12 extends circumferentially beyond the bottom edge 134 of the groove 118 to provide a circumferential overhang portion 158. In other embodiments, not all of these dimensional relationships and associated portions need exist; for example, the overhang portion 152 need not be provided whereby the terminal end of first end 136 could be flush with the free end 129, or could be set back from the free end.

Figure 7:
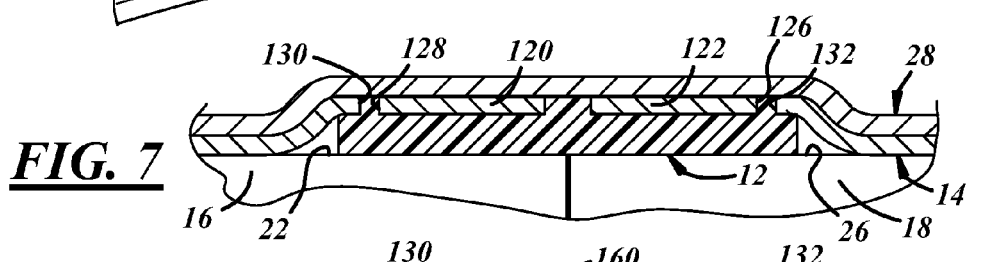
FIG. 7 is an enlarged, fragmentary cross-sectional view taken at 7-7 in FIG. 6.
Figure 8:
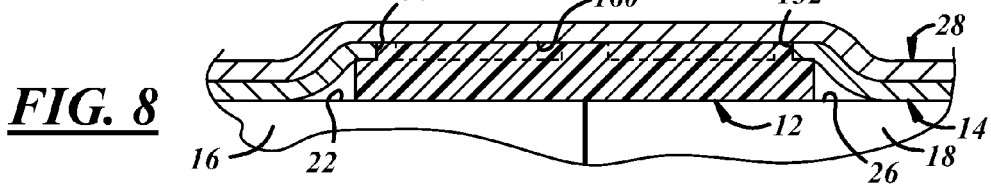
FIG. 8 is an enlarged, fragmentary cross-sectional view taken at 8-8 in FIG. 6.

Referring to FIGS. 6-8, upon penetration of the tongue 116 into the groove 118, the overhang portions 152, 158 of the gasket 12 abut each other and compress against each other in the circumferential direction. When penetrated, a circumferential distance of the gasket 12 measured between the first and second ends 136, 138 can be greater than a circumferential distance of the channel 82, thus causing the compressive interference between the overhang portions 152, 158. Also, the first and second ends 136, 138 compress against the first and second outer surfaces 22, 26 of the first and second pipes 16, 18 in the radial direction. In some cases, the overhang portions 152, 158 can overlap each other. The side edges 126, 128, 130, 132 can, though need not, respectively engage each other at one or more points along their lengths to form areas of sealed metal contact at the metal-to-metal interfaces thereat. Other areas, or all areas, between the side edges 126, 128, 130, 132 can remain separated via one or more spaces. The lateral overhang portions 148, 150, 154, 156 and/or other portions of the gasket 12 can get wedged into the separated spaces between respective side edges 126, 128, 130, 132, and cause the separated spaces as best shown in FIG. 7, to form a gasketed seal (gasket-to-metal) therebetween. Also, the overhang portions 152, 158 and/or other portions of the gasket 12 can fill in a pocket 160 formed in part between the free end 129 of the tongue 116 and the bottom edge 134 of the groove 118 (unpenetrated portion therebetween), as best shown in FIG. 8, to form a gasketed seal thereat. The gasket 12 can also fill in other areas such as the relief slot 124. Thus, upon penetration, only gasketed seals, only metal-to-metal seals, or both metal-to-metal and gasketed seals, can be formed at the tongue and groove joint 92 and at areas formed between the confronting tongue 116 and groove 118.

Through experimentation, the patentee has found that a gasketed seal and a metal-to-metal seal perform differently in use over time. A gasketed seal provides a low leak rate at the start of service, but tends to have a generally increasing leak rate over time (i.e., worsens). It is believed that the increasing leak rate is caused by oxidation and/or deterioration of the gasket with exposure to fluid such as exhaust gasses. A metal-to-metal seal, on the other hand, provides a higher leak rate at the start of service than a gasket seal, but tends to have a generally decreasing leak rate over time (i.e., improves). It is believed that the decreasing leak rate is caused by the build-up of soot, other matter, and/or oxidation at an interface between the metal-to-metal seal.

Table 1 shows the results of one experiment with metal-to-metal seals. The experiment used a pipe clamp with a similar construction to that of FIG. 1, but without the channels 52, 82 and without the gasket 12; instead, the unchanneled portions spanned the entire axial and circumferential extents of the band 28 and split sleeve 14. The pipes and pipe clamp were subjected to heat (e.g., 550-600° C.) and vibration (so-called thermal-vibe test) for a total of 13.3 hours. At zero hours, a pressure of 4.5 p.s.i. (31 kPa) was applied inside of the pipes and the resulting leak rate was measured at the pipe clamp; and again at 13.3 hours, the 4.5 p.s.i. pressure was applied and the resulting leak rate was measured. As demonstrated in all cases, the metal-to-metal seals improved over time with a decreasing leak rate. The leak rate after 13.3 hours was less than 4.0 standard liters per minute (sLpm) and had a leak rate of not greater than half the initial leak rate (0 hours). Of course, not all experiments and cases will yield this exact data.

TABLE 1

| Case | Leak Rate (sLpm) | Hours |
|---|---|---|
| 1 | 3.4 | 0 |
|   | 1.6 | 13.3 |
| 2 | 3.4 | 0 |
|   | 1.7 | 13.3 |
| 3 | 4.3 | 0 |
|   | 1.4 | 13.3 |
| 4 | 4.8 | 0 |
|   | 1.8 | 13.3 |
| 5 | 8.0 | 0 |
|   | 3.2 | 13.3 |
| 6 | 5.7 | 0 |
|   | 2.4 | 13.3 |

Figure 4:
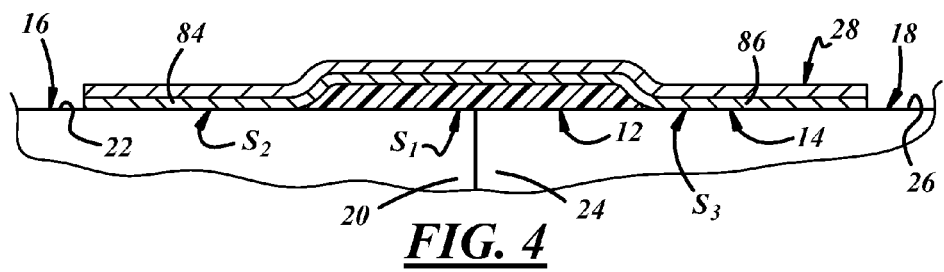
FIG. 4 is an enlarged cross-sectional view of the pipe clamp of FIG. 1 tightened down on a pair of pipes.

Referring to FIG. 4, the gasket 12 compresses against the outer surfaces 22, 26 of the pipes 16, 18 and spans the confrontation of the ends 20, 24 to form a first or initial seal $S_1$ thereat. Also, the side walls 84, 86 of the split sleeve 14 make metal-to-metal contact against the respective outer surfaces 22, 26 to form a second and third or subsequent seals $S_2$, $S_3$ thereat. The pipe clamp 10 utilizes the performance characteristics of the gasketed seals (e.g., $S_1$ and those of the tongue and groove joint 92) and the metal-to-metal seals (e.g., $S_2$, $S_3$, and those of the tongue and groove joints 88, 90) to minimize the change in leak rate over time, and desirably provide a consistent low leak rate over time. As the leak rate of the gasketed seals begins to increase, the leak rate of the metal-to-metal seals begin to decrease.

Table 2 shows the results of one experiment with the first, second, and third seals $S_1$, $S_2$, $S_3$, and the seals of the tongue and groove joints. The experiment used the pipe clamp 10 of FIGS. 1-8, and was performed with similar parameters as described above for Table 1. That is, the pipes and pipe clamp were subjected to heat (e.g., 550-600° C.) and vibration (so-called thermal-vibe test) for a certain amount of total time, and a pressure of 4.5 p.s.i. (31 kPa) was applied inside of the pipes and the resulting leak rate was measured at the pipe clamp at the specified times for each case. Here, the total number of vibration cycles is indicated at the specified times. As demonstrated in all cases, the combined metal-to-metal and gasketed seals maintained a leak rate of less than 5.0 sLpm. And with the exception of case 3, the seals maintained a leak rate of less than 2.0 sLpm. Of course, not all experiments and cases will yield this exact data.

TABLE 2

| Case | Leak Rate (sLpm) | Hours | Vibration Cycles |
|---|---|---|---|
| 1 | 0.9 | 0.0 | 0 |
|   | 0.0 | 12.2 | 4,374,000 |
|   | 0.3 | 24.0 | 8,640,000 |
|   | 1.2 | 36.2 | 13,032,000 |
|   | 1.2 | 48.0 | 17,280,000 |
|   | 1.4 | 50.5 | 18,180,000 |
| 2 | 0.0 | 0.0 | 0 |
|   | 0.7 | 15.0 | 5,400,000 |
|   | 0.7 | 30.0 | 10,800,000 |
|   | 0.6 | 50.0 | 18,000,000 |
| 3 | 1.8 | 0.0 | 0 |
|   | 0.4 | 15.0 | 5,400,000 |
|   | 4.4 | 50.0 | 18,000,000 |
| 4 | 0.0 | 0.0 | 0 |
|   | 0.0 | 15.0 | 5,400.000 |
|   | 0.1 | 30.0 | 10,800,000 |
|   | 0.1 | 50.0 | 18,000,000 |
| 5 | 0.0 | 0.0 | 0 |
|   | 0.1 | 15.0 | 5,400,000 |
|   | 0.2 | 30.0 | 10,800,000 |
|   | 0.3 | 50.0 | 18,000,000 |

The illustrated embodiment of a pipe clamp 210 of FIGS. 9-13 is similar in some ways to that of FIGS. 1-8. These similarities, such as the tightening mechanism, will not be repeated.

Figure 10:
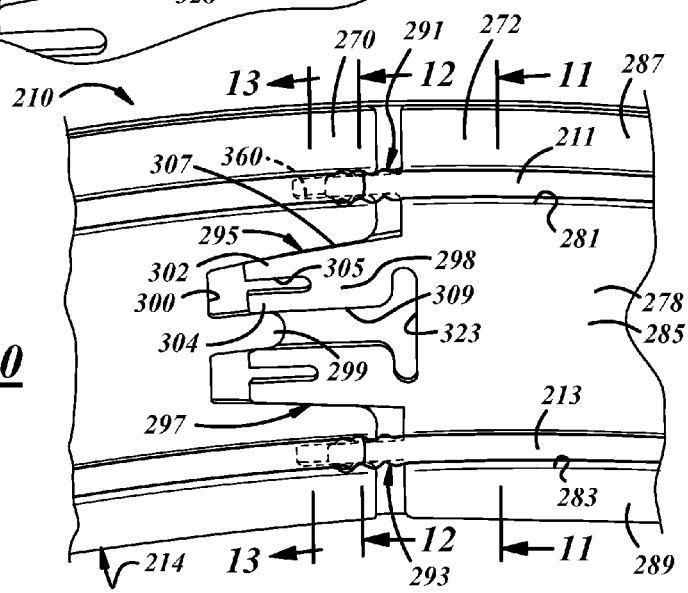
FIG. 10 is a close-up view of exemplary embodiments of multiple tongue-and-groove joints and a pair of gaskets.
Figure 11:
FIG. 11 is an enlarged cross-sectional view taken at 11-11 in FIG. 10.

Referring to FIG. 10, a split sleeve 214 has a first channel 281 and a second channel 283, an unchanneled portion including a center wall 285, a first side wall 287, and a second side wall 289, and a first, second, third, and fourth tongue-and-groove joint 291, 293, 295, 297. The first and second channels 281, 283 respectively receive a first gasket 211 and a second gasket 213. The channels 281, 283 extend circumferentially between first and second circumferential ends 270, 272 of the split sleeve 214. The channels 281, 283 are located in an inner surface 278 and produce slightly radially protruding ribs in an outer surface of the split sleeve 214. As shown in FIG. 11, a band 228 also has a first and second channel 251, 253.

Referring to FIGS. 10 and 11, the center wall 285 extends axially between the channels 281, 283, and the first and second side walls 287, 289 extend in opposite axial directions from the respective channels. Though not shown, the walls 285, 287, 289 can each have an embossment located therein.

Figure 9:
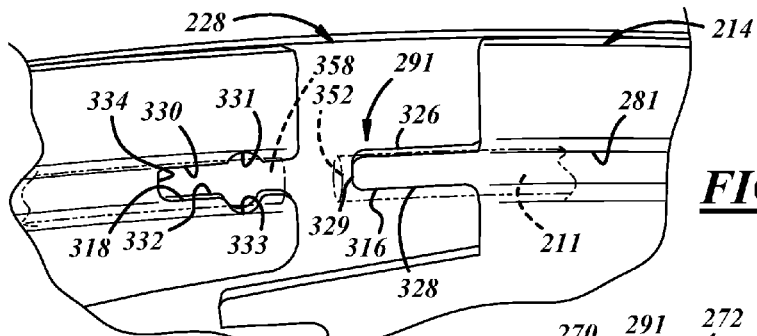
FIG. 9 is a close-up view of an exemplary embodiment of a tongue-and-groove joint and a gasket.

Referring to FIGS. 9 and 10, the first and second joints 291, 293 are located respectively in the channels 281, 283, and the third and fourth joints 295, 297 are located in the center wall 285. The joints 291, 293 have a similar construction and will be described with reference to the joint 291. In the illustrated embodiment, the first joint 291 has a tongue 316 and a groove 318. The tongue 316 has first and second side edges 326, 328, and a free end 329. The groove 318 is bounded by first and second side edges 330, 332 and by a bottom edge 334. A first and second notch 331, 333 are located in respective side edges 330, 332.

The third and fourth joints 295, 297 have tongues that are separated by a relief slot 323 and themselves act as separate spring members (i.e., in a sense, the third and fourth joints together act as a single tongue-and-groove joint, the groove having a tongue-like projection 299). The joints 295, 297 have a similar construction and will be described with reference to the joint 295. The joint 295 has a tongue 298 and a groove 300. The tongue 298 has first and second spring members 302, 304 separated by a relief slot 305. The first spring member 302 has an angled side edge 307 relative to a circumference of the split sleeve 214, and the second spring member 304 has a straight side edge 309. Upon collapse of the third and fourth joints 295, 297, one or both of the respective spring members 302, 304 are deflected toward each other as the tongues penetrate the grooves. The side edges 307, 309 directly contact the confronting side edges of the grooves (metal-to-metal) upon initial penetration and maintain direct contact throughout the entire range of penetration which, as shown in FIG. 10, need not be full penetration. A metal-to-metal seal against fluid leakage is formed between the respective side edges of the tongues and grooves of the third and fourth joints 295, 297.

The gaskets 211, 213 are split gaskets with an open loop structure and a circular cross-sectional profile; of course other structures and cross-sectional profiles are possible. The gaskets 211, 213 each extend circumferentially from a first circumferential end to a second circumferential end. An axial width of the gaskets 211, 213 can be equal to or greater than an axial width of the channels 281, 283, or can be equal to or greater than an axial width of the notches 331, 333. And the axial width of the gaskets 211, 213 can be greater than an axial width of the tongues 316 and an axial width of the grooves 318. Before compression, the axial width of the gaskets 211, 213 could also be less than the axial width of the channels 281, 283, notches 331, 333, tongues 316, and/or grooves 318; and then, upon compression, the axial width of the gaskets 211, 213 can become greater than any or all of these other axial widths. The first circumferential end extends circumferentially beyond the free end 329 of the tongue 316 to provide a circumferential overhang portion 352, and the second circumferential end extends circumferentially beyond the bottom edge 334 of the groove 318 to provide a circumferential overhang portion 358. In other embodiments, the overhang portion 352 need not be provided whereby the terminal end of the first circumferential end could be flush with the free end 329, or could be set back from the free end.

Figure 12:
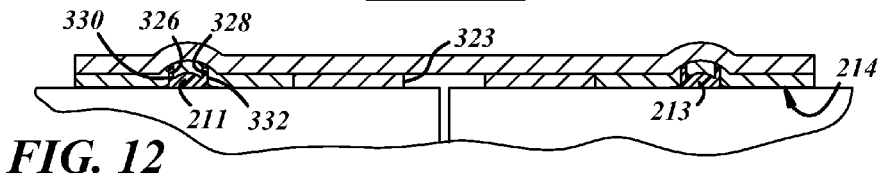
FIG. 12 is an enlarged cross-sectional view taken at 12-12 in FIG. 10, showing the tongue-and-groove joints and gaskets tightened down on a pair of pipes.
Figure 13:
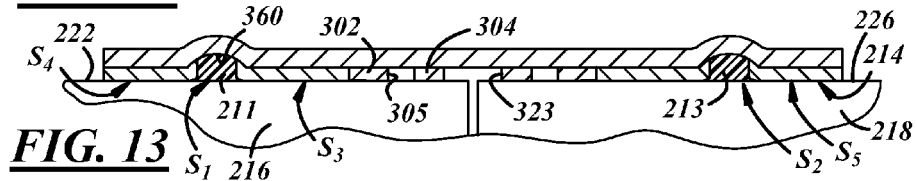
FIG. 13 is an enlarged cross-sectional view taken at 13-13 in FIG. 10, showing the tongue-and-groove joints and gaskets tightened down on a pair of pipes.

Referring to FIGS. 10, 12, and 13, upon penetration of the tongue 316 into the groove 318, portions of the gaskets 211, 213 can get wedged between respective side edges 326, 328, 330, 332 to form a gasketed seal therebetween (best shown in FIG. 12). Also portions of the gaskets 211, 213 can get wedged in the notches 331, 333 to form a gasketed seal thereat. Similar to the embodiment of FIGS. 1-8, the side edges 326, 328, 330, 332 can, though need not, respectively engage each other at one or more points along their lengths to form metal-to-metal seals and gasketed seals. Or some areas, or all areas, between the side edges 326, 328, 330, 332 can remain separated via one or more spaces. The overhang portions 352, 358 and/or other portions of the gaskets 211, 213 can fill in a pocket 360 formed in part between the free end 329 of the tongue 316 and the bottom edge 334 of the groove 318, as best shown in FIG. 13, to form a seal thereat. The gaskets 211, 213 can also fill in other areas.

In use, the first gasket 211 compresses against a first outer surface 222 of a first pipe 216 to form a first or initial seal $S_1$ thereat. The second gasket 213 compresses against a second outer surface 226 of a second pipe 218 to form a second or initial seal $S_2$ thereat. The center wall 285 makes metal-to-metal contact against the outer surfaces 222, 226 and spans the confrontation of the pipes 216, 218 to form a third or subsequent seal $S_3$ thereat. The side walls 287, 289 make metal-to-metal contact against the respective outer surfaces 222, 226 to form a fourth and fifth or subsequent seals $S_4$, $S_5$ thereat. The pipe clamp 210 utilizes the performance characteristics of the gasketed seals ($S_1$, $S_2$, and those of the tongue and groove joints) and the metal-to-metal seals ($S_3$, $S_4$, $S_5$, and those of the tongue and groove joints) to minimize the change in leak rate over time, and desirably provide a consistent low leak rate over time. As the leak rate of the gasketed seals begin to increase, the leak rate of the metal-to-metal seals begin to decrease. Moreover, the effective life of the seals $S_1$, $S_2$ of the illustrated embodiment of FIGS. 9-13 can be greater than the effective life of the seal $S_1$ of the illustrated embodiment of FIGS. 1-8 because the gaskets 211, 213 are not as directly exposed to fluid as the gasket 12.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A pipe clamp comprising:
a band extending circumferentially from a first end to a second end;
a tightening mechanism connected to said band near said first and second ends, said tightening mechanism including at least one fastener to bring said first and second ends toward each other to tighten said band;
a split sleeve located radially inside of said band, said split sleeve extending axially from a first side to a second side and extending circumferentially from a first circumferential end to a second circumferential end, said split sleeve having at least one channel located between said first and second sides and extending between said first and second circumferential ends, said split sleeve including at least one tongue-and-groove joint, said tongue being located at said first circumferential end and said groove being located at said second circumferential end confronting said tongue, said tongue having a side edge and said groove having a side edge that confronts said side edge of said tongue at one or more points along their length during penetration of said tongue into said groove such that said tongue and groove have areas of spaced separation between their confronting side edges when said band is fully tightened about a pair of abutting pipe ends; and
at least one gasket located radially inside of said split sleeve and received in said channel, wherein, upon tightening of said band and penetration of said tongue into said groove, said at least one gasket is wedged into at least some of said areas of spaced separation between said side edges of said tongue and groove and forms a seal therebetween.

2. The pipe clamp of claim 1, wherein said tightening mechanism includes a first and second nut, a reaction block, a backing plate, and said at least one fastener includes a first and second bolt, wherein upon assembly said first and second bolts are inserted through said first and second ends of said band, through said reaction block, and through said backing plate.

3. The pipe clamp of claim 1, wherein said split sleeve has an unchanneled portion located between said first and second sides and extending between said first and second circumferential ends, wherein upon tightening of said band said at least one gasket compresses against an outer surface of a first pipe, a second pipe, or both to form a seal thereat, and upon tightening of said band said unchanneled portion makes metal-to-metal contact against the outer surface of the first pipe, the second pipe, or both to form a seal thereat.

4. The pipe clamp of claim 1, wherein upon tightening of said band and penetration of said tongue into said groove, said at least one gasket compresses against an outer surface of a first pipe, a second pipe, or both and fills in a pocket formed in part by a free end of said tongue and an unpenetrated portion of said groove, said at least one gasket forming a seal thereat.

5. The pipe clamp of claim 1, wherein said at least one gasket is a split gasket extending circumferentially from a first circumferential end to a second circumferential end, said first circumferential end located at said tongue and, when not tightened and not penetrated, said first circumferential end has a circumferential overhang portion overhanging a free end of said tongue, said second circumferential end located at said groove and, when not tightened and not penetrated, said second circumferential end has a circumferential overhang portion overhanging a bottom edge of said groove.

6. The pipe clamp of claim 1, wherein said split sleeve has a first unchanneled portion located between said first side and said channel and extending between said first and second circumferential ends, said split sleeve has a second unchanneled portion located between said second side and said channel and extending between said first and second circumferential ends, upon tightening of said band said gasket compresses against an outer surface of both a first pipe and a second pipe and spans a confrontation of the first and second pipes and forms a seal thereat, upon tightening of said band said first unchanneled portion makes metal-to-metal contact against the outer surface of the first pipe and forms a seal thereat, and upon tightening of said band said second unchanneled portion makes metal-to-metal contact against the outer surface of the second pipe and forms a seal thereat.

7. The pipe clamp of claim 6, wherein said at least one tongue-and-groove joint includes a first tongue-and-groove joint located at said channel, a second tongue-and-groove joint located at said first unchanneled portion, and a third tongue-and-groove joint located at said second unchanneled portion.

8. The pipe clamp of claim 1, wherein said at least one channel includes a first channel and a second channel, said split sleeve having an unchanneled portion located between said first channel and said second channel and extending between said first and second circumferential ends, said at least one gasket includes a first gasket received in said first channel and includes a second gasket received in said second channel, upon tightening of said band said first gasket compresses against an outer surface of a first pipe and forms a seal thereat, upon tightening of said band said second gasket compresses against an outer surface of a second pipe and forms a seal thereat, and upon tightening of said band said unchanneled portion makes metal-to-metal contact against both the outer surfaces of the first and second pipes and spans a confrontation of the first and second pipes and forms a seal thereat.

9. The pipe clamp of claim 8, wherein said at least one tongue-and-groove joint includes a first tongue-and-groove joint located at said first channel, a second tongue-and-groove joint located at said second channel, a third tongue-and-groove joint located at said unchanneled portion, and a fourth tongue-and-groove joint located at said unchanneled portion.

10. The pipe clamp of claim 1, wherein said at least one gasket is located at said tongue and, when not tightened and not penetrated, has a lateral overhang portion overhanging said side edge of said tongue, and wherein, upon tightening of said band and penetration of said tongue into said groove, said lateral overhang portion is wedged into at least some of said areas of spaced separation between said side edges of said tongue and groove and remains therein and forms a seal therebetween.

11. A pipe clamp comprising:
a band extending circumferentially from a first end to a second end;
a tightening mechanism connected to said band near said first and second ends, said tightening mechanism including at least one fastener to bring said first and second ends toward each other to tighten said band;
a split sleeve located radially inside of said band, said split sleeve extending axially from a first side to a second side and extending circumferentially from a first circumferential end to a second circumferential end, said split sleeve having at least one channel located between said first and second sides and extending between said first and second circumferential ends, said split sleeve including at least one tongue-and-groove joint, said tongue being located at said first circumferential end and said groove being located at said second circumferential end, said tongue and groove each having a side edge; and
at least one gasket located radially inside of said split sleeve and received in said channel, wherein, upon tightening of said band and penetration of said tongue into groove, said side edges of said tongue and groove confront each other at one or more points to form a spaced separation at the confrontation, and said at least one gasket is wedged between said side edges of said tongue and groove at the spaced separation to form a gasketed seal thereat.

12. A pipe clamp comprising:
a band extending circumferentially from a first end to a second end;
a tightening mechanism connected to said band near said first and second ends, said tightening mechanism including at least one fastener to bring said first and second ends toward each other to tighten said band;
a split sleeve located radially inside of said band, said split sleeve extending axially from a first side to a second side and extending circumferentially from a first circumferential end to a second circumferential end, said split sleeve having at least one channel located between said first and second sides and extending between said first and second circumferential ends, said split sleeve including at least one tongue-and-groove joint, said tongue being located at said first circumferential end and said groove being located at said second circumferential end confronting said tongue; and
at least one split gasket located radially inside of said split sleeve and received in said channel, said at least one split gasket extending circumferentially from a first circumferential end to a second circumferential end, said first circumferential end located at said tongue and, when not tightened and penetrated, said first circumferential end has a first circumferential overhang portion overhanging a free end of said tongue, said second circumferential end located at said groove and, when not tightened and not penetrated, said second circumferential end has a second circumferential overhang portion overhanging a bottom edge of said groove;
wherein, upon tightening of said band and penetration of said tongue into said groove, said first and second circumferential overhang portions of said at least one split gasket compress against each other in the circumferential direction, and said at least one split gasket compresses against an outer surface of a first pipe, of a second pipe, or of both and at least one of said circumferential portions fills in a pocket formed in part by the free end of said tongue, an unpenetrated portion of said groove, and said bottom edge of said groove, said at least one split gasket forming a seal at said pocket.

13. The pipe clamp of claim 12, wherein said split sleeve has a first unchanneled portion located between said first side and said channel and extending between said first and second circumferential ends, said split sleeve has a second unchanneled portion located between said second side and said channel and extending between said first and second circumferential ends, said at least one tongue-and-groove joint includes a first tongue-and-groove joint located at said channel, a second tongue-and-groove joint located at said first unchanneled portion, and a third tongue-and-groove joint located at said second unchanneled portion.

14. The pipe clamp of claim 13, wherein, upon tightening of said band and penetration of said tongues into said grooves of said first and second and third tongue-and-groove joints, a side edge of said tongue and a side edge of said groove of said first tongue-and-groove joint confront each other at one or more points to form a spaced separation at the confrontation and said at least one split gasket is wedged between said side edges of said first tongue-and-groove joint at the spaced separation to form a gasketed seal thereat, a side edge of said tongue and a side edge of said groove of said second tongue-and-groove joint directly contact each other to form a metal-to-metal seal thereat, and a side edge of said tongue and a side edge of said groove of said third tongue-and-groove joint directly contact each other to form a metal-to-metal seal thereat.

\* \* \* \* \*